Patented Aug. 8, 1939

2,169,152

UNITED STATES PATENT OFFICE 2,169,152

AZO DYESTUFFS AND PROCESS OF MAKING SAME

Otto Kaiser, Basel, Switzerland, assignor to the firm Society of Chemical Industry in Basle, Basel, Switzerland No Drawing. Application January 21, 1938, Serial No. 186,245. In Switzerland January 26, 1937

15 Claims. (Cl. 260—173)

In prior patent applications the manufacture of acyl derivatives of azo-dyestuffs containing OH-groups has been described in which the dyestuff in presence of a tertiary base, for instance pyridine, is treated with an acylating agent containing besides the acylating group at least one substituent which of itself or after suitable transformation brings about or enhances the solubility of the azo-dyestuff.

This invention is based on the observation that this process is very suitable for introducing into water-soluble azo-dyestuffs an acyl residue which, in contrast with the acyl residues used in the aforesaid manufacture, does not contain a substituent which bring about or enhances the solubility in water of the azo-dyestuff.

The process is especially suitable for introducing the acyl residue into a water-soluble dyestuff containing a group capable of acylation. According to the new method of working there are formed products in many cases which are different from those obtainable according to the hitherto usual methods—acylation in aqueous medium in presence of acid binding agents. This is probably due to the fact that if the acylation is carried out in pyridine or other suitable tertiary bases, such amino groups are easily acylated which otherwise react difficultly, for example due to the presence of a sulfo-group in ortho-position. It is also possible that primary amino-groups are acylated in such a manner that the two hydrogen atoms are replaced by acyl radicals.

Among acylating agents which come into question there may be named compounds such as acetyl chloride, acetic anhydride, maleic anhydride, benzoyl chloride, nitrobenzoyl chlorides, anisoyl chloride, benzene sulfonic chloride, toluene-sulfonic chlorides, cinnamic chloride, arylhydroxyacetic acid halides, for instance phenoxyacetic acid chloride; also acylating agents which are derived from polyvalent acids, for instance phosgene, isocyanates, mustard oil, terephthalic acid dichloride, malonyl chloride or the like.

Examples of water-soluble azo-dyestuffs are those which contain at least one group capable of acylation, for instance a primary or secondary amino-group and/or OH-groups. The dyestuffs may contain both amino and OH-groups, in which case it may be of advantage that after the acylation the dyestuff may be partially saponified so that only for example the aminogroup remains acylated in the final products.

Among such azo-dyestuffs may be named:

Simple amino- or hydroxy-azo-dyestuffs, for instance sulfonated azo-dyestuffs like the azo-dyestuff from diazotized 1-aminobenzene-4-sulfonic acid and 2-hydroxynaphthalene, the saponified azo-dyestuff from diazotized 1-amino-4-acetylaminobenzene and 1-hydroxybenzene-2-carboxylic acid or the azo-dyestuffs from diazotized 1-aminobenzene-4-sulfonic acid and 1-amino- or 2-aminonaphthalene; or dyestuffs which contain both OH- and NH$_2$-groups, for instance the dyestuff from diazotized 1-amino-2-hydroxy-5-nitrobenzene and 1:3-diaminobenzene-4-sulfonic acid.

There also come into question the various primary and secondary or primary-secondary dis- and polyazo-dyestuffs.

The following examples, the number of which could be multiplied, illustrate the invention and the properties of the products obtained thereby. The parts are by weight.

*Example 1*

27.1 parts of 4'-amino-4-hydroxy-3-methyl-azobenzene-5-carboxylic acid are dissolved in 1000 parts of pyridine. Into the solution are run while stirring at 40° C. 17.2 parts of cinnamic acid chloride, and the temperature is gradually raised to 90° C. After one hour the product is separated. When dried it is a yellow-brown powder which dyes cotton yellow. The new dyestuff has probably the following constitution:

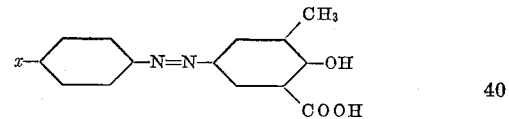

($x$ standing for a cinnamoylated amino-group).

*Example 2*

20 parts of a mono-azo-dyestuff obtained by coupling diazotized 1-aminonaphthalene with 2-amino-naphthalene-7-sulfonic acid are treated in 200 parts of pyridine with 18 parts of benzoyl chloride and 1 part of copper powder and the condensation product is separated as soon as a free amino-group can no longer be detected. It is a red-brown powder which dyes wool orange tints fast to light. The new dyestuff probably the following constitution:

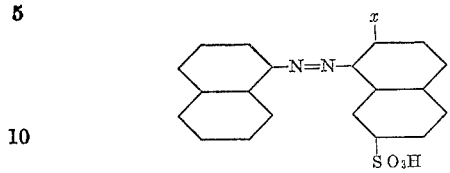

(*x* standing for a benzoylated amino-group). When replacing the benzoylchloride by a para-toluene-sulfochloride there are obtained products which dye wool yellower tints.

Example 3

20 parts of the azo-dyestuff obtained by coupling diazotized 1-aminonaphthalene-4-sulfonic acid with 1-aminonaphthalene are dissolved in 200 parts of pyridine. After the addition of 1 part of copper powder there is run in at 40° C. 21.6 parts of benzoyl chloride and the temperature is raised gradually to 90° C. After an hour the product is separated. It is a red-brown powder which dyes wool red-brown. The new dyestuff has probably the following constitution:

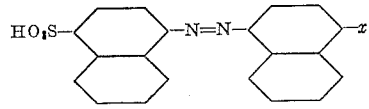

(*x* standing for a benzoylated amino-group). When replacing the benzoyl chloride by benzoic acid anhydride there is obtained a dyestuff which behaves similarly; para-toluene-sulfochloride leads also to a product which dyes wool brown tints.

Example 4

16.5 parts of the azo-dyestuff obtained by coupling diazotized 1-aminobenzene-4-sulfonic acid with 1-aminonaphthalene are treated in 200 parts of pyridine at 40° C. with 17 parts of acetic anhydride and 1 part of copper powder. The temperature of the mixture rises to 50° C. The whole is heated for an hour at 90° C. and the product is separated. It is a dark brown powder which dyes wool yellow. The new dyestuff has probably the following constitution:

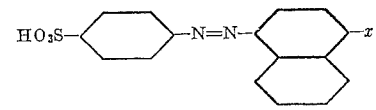

(*x* standing probably for a diacetylated amino-group).

Example 5

62.1 parts of the azo-dyestuff obtained by coupling diazotized para-toluenesulfonic acid ester of 1-amino-8-hydroxynaphthalene-3:6-disulfonic acid with 1-amino-2-methoxy-5-methylbenzene are dissolved in 1000 parts of pyridine and the solution is mixed with 17.2 parts of cinnamic acid chloride. The mixture is stirred for one hour at 90° C. and then the solvent is evaporated. The toluenesulfonic acid ester obtained is saponified in aqueous solution with caustic soda lye at about 75° C. and the product is separated by acidifying and salting out. It is a dark brown powder which dyes viscose artificial silk yellow-red tints. The new dyestuff has probably the following constitution:

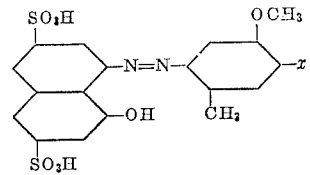

(*x* standing for a benzoylated amino-group).

The procedure is similar when the cinnamic acid chloride is exchanged for 1 mol benzoyl chloride.

Example 6

21.1 parts of the mono-azo-dyestuff, produced from diazotized 1-aminonaphthalene-4-sulfonic acid and 1:3-diaminobenzene-4-sulfonic acid are suspended in 200 parts of pyridine and the suspension is mixed at 40° C. with 25.3 parts of benzoyl chloride. The reaction mixture is heated for 1 hour to 90° C. and the dibenzoylated product of the mono-azo-dyestuff is separated from the solvent. It is a red yellow powder which dyes wool brown-yellow tints. The new dyestuff has probably the following constitution:

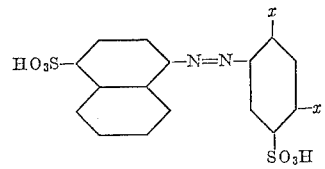

(*x* standing for a benzoylated amino-group).

When replacing the 1-amino-naphthalene-4-sulfonic acid by the corresponding quantity of dehydrothiotoluidine-mono-sulfonic acid and treating the mono-azo-dyestuff with benzoyl chloride as above, there is obtained a benzoylated dyestuff which dyes cotton yellow tints. The new dyestuff has very probably the formula

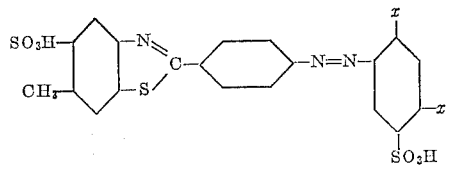

(*x* standing for a benzoylated amino-group).

Similar products are obtained if the benzoyl chloride is replaced by meta-nitro-benzoyl chloride, para-chlorobenzoyol chloride or butyric acid chloride.

Example 7

53.9 parts of the diazo-dyestuff obtained by coupling diazotized 2-aminonaphthalene-4:8-disulfonic acid with 1-amino-3-methylbenzene, again diazotizing and coupling with a second mol of 1-amino-3-methylbenzene are treated in 1000 parts of pyridine with 15.4 parts of benzoyl chloride and as soon as no free amino-group can be detected the product is separated. It is a red-brown powder which dyes cotton yellow-brown. The new dyestuff has the formula:

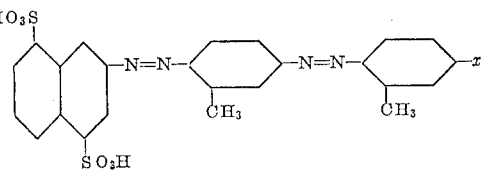

(*x* standing for a benzoylated amino-group).

When replacing the benzoyl chloride in the above paragraph by another acylating agent, for example by the dichlorobenzoyl chloride, the 1-naphthoyl chloride, the phenoxy acetic acid chloride, the acetic acid anhydride, the propionic acid anhydride or the lauric acid chloride, there are obtained similar dyestuffs.

The various constituents of the parent dyestuff can be replaced by their equivalents without the tinctorial properties of the final products being essentially changed thereby.

Thus the starting component can be replaced by another amino-naphthalene sulfonic acid, for example by the 1-aminonaphthalene-3:6-disulfonic acid, the 1:5-naphthylamine-sulfonic acid or an amino-sulfonic acid of the benzene series, the 1-aminobenzene-3-sulfonic acid or 1-aminobenzene-4-sulfonic acid.

The middle component can be replaced by aniline (preferably in the form of the ω-methane sulfonic acid), further by 1-amino-2-methoxy-5-methylbenzene, 1-aminonaphthalene, 1-amino-2-methoxynaphthalene, 1-amino - 2 - ethoxynaphthalene, 1-aminonaphthalene-6-sulfonic acid, 1-aminonaphthalene-7-sulfonic acid, 1-amino-2-methoxy- or -2-ethoxynaphthalene-6- or -7-sulfonic acid and the like.

The final component can be replaced by the above middle components or by diamines, such as for example meta-phenylenediamine, meta-toluene-diamine, 1:3-diaminobenzene-4- or -5-sulfonic acid, 1:3-diamino-4-nitrobenzene and the like.

Thus the dyestuffs of the formulas:

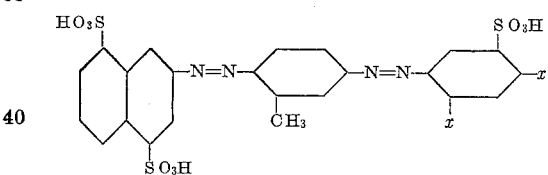

($x$ standing for a benzoylated or acetylated amino-group)

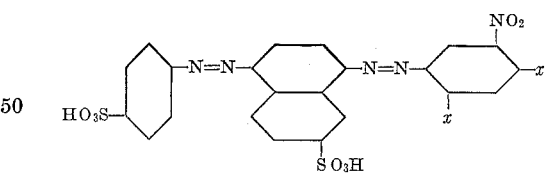

($x$ standing for a benzoylated amino-group) dye cotton yellow-brown tints.

Example 8

1 mol of the trisazo-dyestuff obtained by diazotizing one of the diazotizable parent dyestuffs named in the foregoing example and coupling with 1:3-diaminobenzene-4-sulfonic acid, for example the dyestuff from 1 mol of diazotized 2-aminonaphthalene-4:8-disulfonic acid and 1 mol of 1-amino-3-methylbenzene, further diazotizing and coupling with 1 mol of 1-amino-3-methylbenzene, finally diazotizing and coupling with 1 mol of 1:3-diaminobenzene-4-sulfonic acid is dissolved in 10–15 times the weight of pyridine and the solution is mixed at 40° C. with 2 mol benzoyl chloride. The whole is heated gradually to 90° C. and kept at this temperature for one hour. After this period the dibenzoyl product is separated and dried. It dyes cotton orange-brown which is fast to light and capable of discharge. The product has the formula:

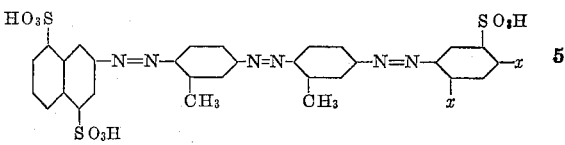

($x$ standing for a benzoylated amino-group). If the benzoylation is carried out in the presence of dimethylaniline there is obtained a product which dyes cotton somewhat browner tints. The condensation can also be carried out in the presence of tripropylamine and the benzoylation of these dyestuffs can also be carried out with benzoic acid anhydride.

When replacing the benzoyl chloride in the dyestuff of the first paragraph of this example by another acylating agent, for instance by dichloro-benzoyl chloride, para-nitro- or meta-nitro-benzoyl chloride, naphthoic acid chloride, phenoxy-acetic acid chloride, phenyl-acetic acid chloride, acetic acid anhydride, propionic acid anhydride, butyric acid anhydride, lauric acid chloride and the like, there are obtained similar dyestuffs. In the parent dyestuff the various constituents can be replaced by their equivalents without the properties of the final dyestuffs being essentially changed thereby in the acylation. Thus for example the final component, the 1:3-diaminobenzene-4-sulfonic acid, can be replaced by the following final components: 1:3-diaminobenzene-5-sulfonic acid, 1:3 diaminobenzene-2-methyl-5-sulfonic acid, 1:3-diaminobenzene-4-methyl-5-sulfonic acid, 1:3-diaminobenzene-4-phenoxy-4'-sulfonic acid, 1:3-diaminobenzene-2-methoxy-5-sulfonic acid, 1:3 diaminobenzene-4-ethoxy-5-sulfonic acid, 1:3-diaminobenzene, 1:3-diamino-4-methylbenzene, 1:3-diamino-4-nitrobenzene, 1:3-diamino-4-chlorobenzene and the like. In the case of unsulfonated final components it is advisable to introduce one sulfo-group more into the other part of the azo-dyestuff molecule. Such dyestuffs follow from the following data:

The middle components of the first paragraph of this example, (the two mols 1-amino-3-methylbenzene) can be replaced wholly or partially by the following products: aniline (preferably in the form of the ω-methane-sulfonic acid) ortho-anisidine (preferably in the form of the ω-methane-sulfonic acid) ortho-toluidine (preferably in the form of the ω-methane-sulfonic acid) para-xylidine, 1-amino-2-methoxyl or 2-ethoxy-5-methylbenzene, 1-amino-2:5-dimethoxy- or -diethoxy-benzene, mono-acetyl-meta-phenylendiamine, α-naphthylamine, 1-amino-2-methoxynaphthalene, 1-aminonaphthalene-6- or -7-sulfonic acid, 1-amino-2-methoxyl-naphthalene-6- or -7-sulfonic acid and the like.

The starting component can finally be replaced by the following compounds:

2-aminonaphthalene - 3:6 - disulfonic acid, 2-aminonaphthalene-6:8-disulfonic acid, 2-aminonaphthalene - 4:7 - disulfonic acid, 2 - aminonaphthalene - 3:6:8 - trisulfonic acid, 2-aminonaphthalene-8-sulfonic acid, 2-aminonaphthalene-6- or -7-sulfonic acid, 1-aminonaphthalene-4- or -5-sulfonic acid, 1-aminonaphthalene-3:6-disulfonic acid, 1-aminonaphthalene-3:6:8-trisulfonoic acid, 1-aminonaphthalene-4:7-disulfonic acid, 1-amino-8-hydroxynaphthalene-3:6-disulfonic acid (preferably in the form of an O-ester), 1-aminobenzene-4-sulfonic acid, 1-aminobenzene-2:4- or -2:5-disulfonic acid, 1-aminobenzene-2-chloro-5-sulfonic acid, 1-aminobenzene-4-nitro-2-sulfonic acid and the like.

The starting component and the second component can also be used in the form of monoazo-dyestuffs, such as 4-amino-azo-benzene-4'- or -3-sulfonic acid or 4-amino-azo-benezene-3:4'-disulfonic acid.

The parent azo-dyestuffs have therefore the following constitutions, for example:

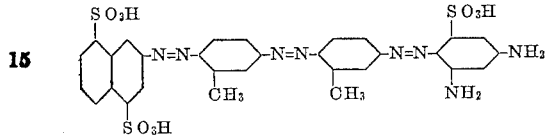

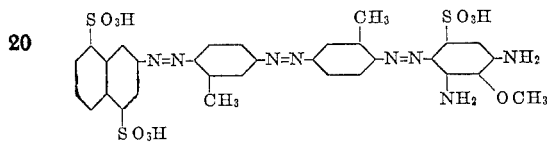

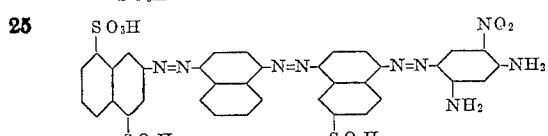

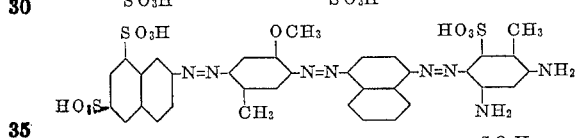

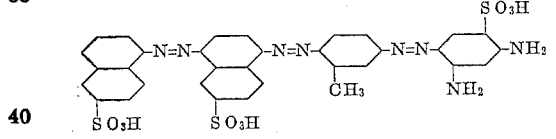

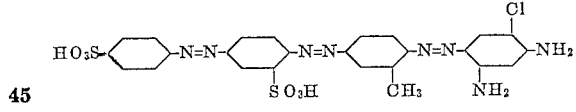

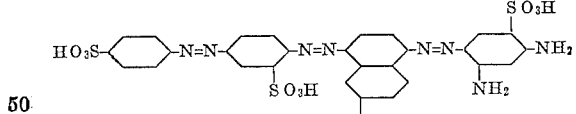

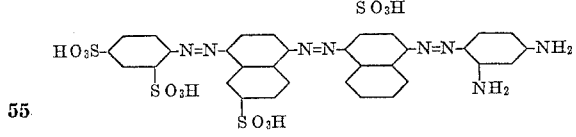

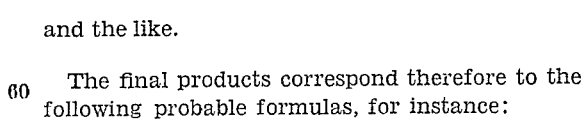

and the like.

The final products correspond therefore to the following probable formulas, for instance:

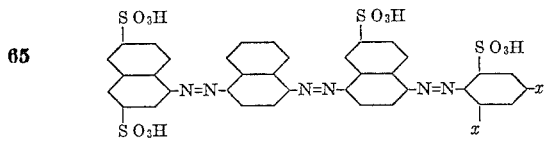

($x$ standing for a $\beta$-naphthoylated amino-group)

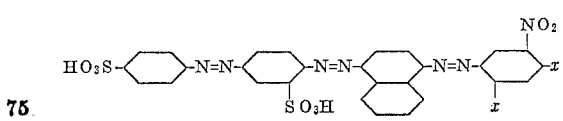

($x$ standing for a phenoxyacetylated amino-group)

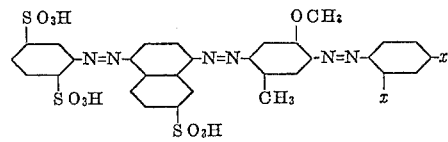

($x$ standing for a benzoylated amino-group)

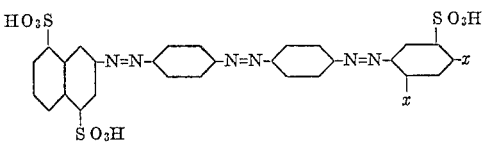

($x$ standing for a propionylated amino-group)

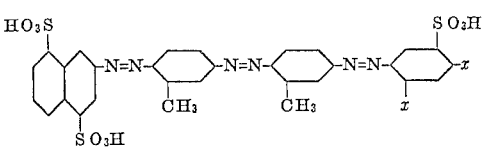

($x$ standing for a m-nitrobenzoylated amino-group or a 2:4-dichlorbenzoylated amino-group)

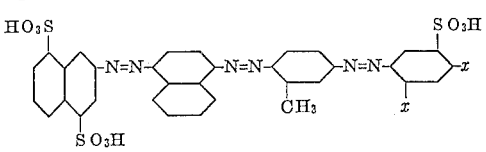

($x$ standing for an acetylated amino-group)

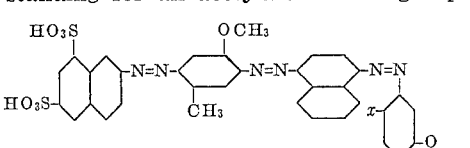

($x$ standing for a benzoylated amino-group)

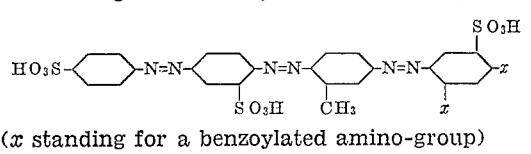

($x$ standing for a benzoylated amino-group)

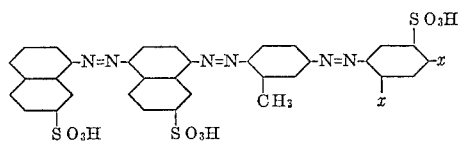

($x$ standing for a benzoylated amino-group)

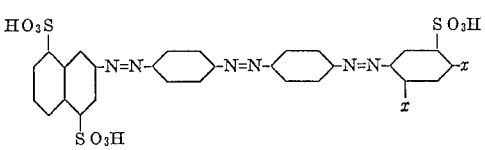

($x$ standing for a benzoylated amino-group).

The dyestuffs obtainable according to this example correspond therefore to the general formula $$R_1-N=N-R_2-N=N-R_3-N=N-R_4$$

in which $R_1$, $R_2$ and $R_3$ stand for aromatic isocyclic six-membered rings which are condensed at most with a second aromatic isocyclic six-membered ring (in other words in which $R_1$, $R_2$ and $R_3$ stand for arylene radicals of the group consisting of phenylene and naphthylene), of which six-membered rings at least one ring carries at least one sulfo-group, in which further the six-membered rings $R_2$ and $R_3$ are linked to the azo-groups by their 1- and 4-positions, in which $R_4$ stands for an aromatic isocyclic six-membered ring which is substituted in ortho- and in para-position to the azo-group by an acylated amino-group, and in which finally at least two sulfonic acid groups are distributed to the rings $R_1$, $R_2$, $R_3$ and $R_4$, which products are dark powders dissolving in water to orange to brown solutions and dyeing cotton and cellulose fibers (regardless of whether it is question of natural or regenerated cellulose) similar tints which are fast to light.

*Example 9*

86.2 parts of the trisazo-dyestuff obtained by coupling the azo-dyestuff from 1 mol diazotized dehydro-thiotoluidinedisulfonic acid and 1 mol 1:3-diaminobenzene with 1 mol of the so-called intermediate product from 1 mol 4:4'-tetrazo-diphenyl and 1 mol of 1-hydroxybenzene-2-carboxylic acid are dissolved in about 10 parts of pyridine, and into the solution are dropped while stirring at 40° C. 30.8 parts of benzoyl chloride. The dyestuff solution is heated and retained at 90° C. for one hour. The dyestuff is salted out from the solution. It dyes cotton light brown, and corresponds very probably to the formula:

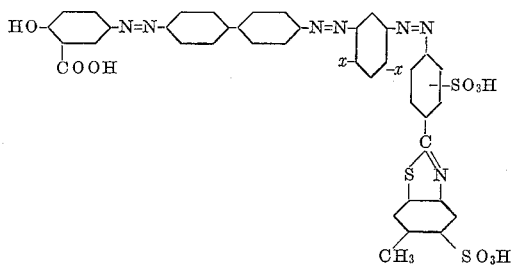

($x$ standing for a benzoylated amino-group).

What I claim is:

1. Process for the manufacture of azo-dyestuff derivatives, consisting in treating water-soluble azo-dyestuffs containing at least one group capable of acylation with such acylating agents selected from the group consisting of the halides and the anhydrides of monovalent organic carboxylic acids, the acylation being performed in a medium consisting of a tertiary base.

2. Process for the manufacture of azo-dyestuff derivatives, consisting in treating water-soluble azo-dyestuffs containing at least one group capable of acylation with such acylating agents selected from the group consisting of the halides and the anhydrides of monovalent organic carboxylic acids, the acylation being performed in a medium consisting of pyridine.

3. Process for the manufacture of azo-dyestuff derivatives, consisting in treating water-soluble poly-azo-dyestuffs containing at least one primary amino group with such acylating agents selected from the group consisting of the halides of monovalent aromatic monocarboxylic acids of the benzene series, the acylation being performed in a medium consisting of pyridine.

4. Process for the manufacture of azo-dyestuff derivatives, consisting in treating water-soluble azo-dyestuffs in the manufacture of which a 1:3-diprimary diamine of the benzene series has been used as coupling component, with such acylating agents selected from the group consisting of the halides of monovalent aromatic monocarboxylic acids of the benzene series, the acylation being performed in a medium consisting of pyridine.

5. Process for the manufacture of azo-dyestuff derivatives, consisting in treating water-soluble azo-dyestuffs which contain more than one azo-group and in the manufacture of which a 1:3-diprimary diamine of the benzene series has been used as coupling component, with such acylating agents selected from the group consisting of the halides of monovalent aromatic monocarboxylic acids of the benzene series, the acylation being performed in a medium consisting of pyridine.

6. Process for the manufacture of azo-dyestuff derivatives, consisting in treating water-soluble trisazo-dyestuffs in the manufacture of which a 1:3-diprimary diamine of the benzene series has been used as final component, with benzoyl chloride, the benzoylation being performed in a medium consisting of pyridine.

7. The azo-dyestuffs containing at least one azo-group and at least one sulfonic acid group which are characterized by the presence of the atom grouping —N=N—R, in which R stands for an aromatic isocyclic six-membered ring substituted in ortho- and in para-position to the azo-group by an acylated amino-group each, which products are yellow to orange and brown powders dissolving in water to yellow to orange and brown solutions and dyeing the fiber similar tints.

8. The azo-dyestuff of the general probable formula $$R_1-N=N-R_2-N=N-R_3$$

in which $R_1$ and $R_2$ stand for arylene radicals of the group consisting of phenylene and naphthalene, of which arylene radicals at least one carries at least one sulfo-group, in which further the arylene radical $R_2$ is linked to the azo-groups by its 1- and 4-positions, in which further $R_3$ stands for a mono-nuclear aromatic iso-cyclic six-membered ring which is substituted in ortho- and in para-position to the azo-group by an acylated amino-group each and in which finally at least two sulfonic acid groups are distributed to $R_1$, $R_2$ and $R_3$, which products are dark powders, dissolving in water to orange to brown solutions and dyeing cotton similar tints which are fast to light.

9. The azo-dyestuffs of the general probable formula

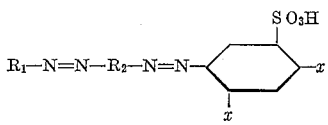

in which $R_1$ and $R_2$ stand for arylene radicals of the group consisting of phenylene and naphthalene, of which arylene radicals at least one carries at least one sulfo-group, in which further the arylene radical $R_2$ is linked to the azo-groups by its 1- and 4-positions, and in which $x$ stands for a benzoylated amino-group, which products are dark powders, dissolving in water to orange to brown solutions and dyeing cotton similar tints which are fast to light.

10. The azo-dyestuffs of the general probable formula

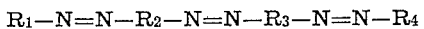

in which $R_1$, $R_2$ and $R_3$ stand for arylene radicals of the group consisting of phenylene and naphthalene, of which arylene radicals at least one carries at least one sulfo-group, in which further the arylene radicals $R_2$ and $R_3$ are linked to the azo-groups by their 1- and 4-positions, in which $R_4$ stands for a mono-nuclear aromatic iso-cyclic six-membered ring which is substituted in ortho- and in para-position to the azo-group by an acylated amino-group each, and in which finally at least two sulfonic acid groups are distributed to $R_1$, $R_2$, $R_3$ and $R_4$, which products are dark powders, dissolving in water to orange to brown solutions and dyeing cotton similar tints which are fast to light.

11. The azo-dyestuffs of the general probable formula

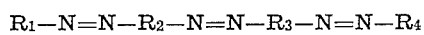

in which $R_1$, $R_2$ and $R_3$ stand for arylene radicals of the group consisting of phenylene and naphthalene, of which arylene radicals at least one carries at least one sulfo-group, in which further the arylene radicals $R_2$ and $R_3$ are linked to the azo-groups by their 1- and 4-positions, in which $R_4$ stands for a mono-nuclear aromatic iso-cyclic six-membered ring which is substituted in ortho- and in para-position to the azo-group by an aroylated amino-group each, and in which finally at least two sulfonic acid groups are distributed to $R_1$, $R_2$, $R_3$ and $R_4$, which products are dark powders, dissolving in water to orange to brown solutions and dyeing cotton similar tints which are fast to light.

12. The azo-dyestuffs of the general probable formula

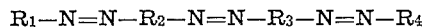

in which $R_1$, $R_2$ and $R_3$ stand for arylene radicals of the group consisting of phenylene and naphthalene, of which arylene radicals at least one carries at least one sulfo-group, in which further the arylene radicals $R_2$ and $R_3$ are linked to the azo-groups by their 1- and 4-positions, in which $R_4$ stands for a mono-nuclear aromatic iso-cyclic six-membered ring is substituted in ortho- and in para-position to the azo-group by a benzoylated amino-group each, and in which finally at least two sulfonic acid groups are distributed to $R_1$, $R_2$, $R_3$ and $R_4$, which products are dark powders, dissolving in water to orange to brown solutions and dyeing cotton similar tints which are fast to light.

13. The azo-dyestuffs of the general probable formula

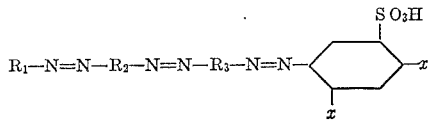

in which $R_1$, $R_2$ and $R_3$ stand for arylene radicals of the group consisting of phenylene and naphthalene, of which arylene radicals at least one carries at least one sulfo-group, in which further the arylene radicals $R_2$ and $R_3$ are linked to the azo-groups by their 1- and 4-positions, and in which $x$ stands for a benzoylated amino-group, which products are dark powders, dissolving in water to orange to brown solutions and dyeing cotton similar tints which are fast to light.

14. The azo-dyestuffs of the general probable formula

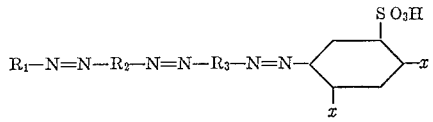

in which $R_1$ represents a naphthalene radical carrying two sulfonic acid groups, $R_2$ and $R_3$ stand for phenylene radicals linked to the azo-groups by their 1- and 4-positions, and in which $x$ stands for a benzoylated amino-group, which products are dark powders, dissolving in water to orange to brown solutions and dyeing cotton similar tints which are fast to light.

15. The azo-dyestuff of the formula

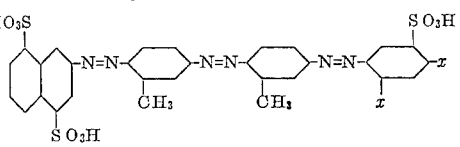

in which $x$ stands for a benzoylated amino-group.

OTTO KAISER.